United States Patent
Liu et al.

(10) Patent No.: US 9,232,562 B2
(45) Date of Patent: Jan. 5, 2016

(54) METHOD AND APPARATUS FOR CONCURRENT COMMUNICATION WITH MULTIPLE WIRELESS COMMUNICATION SYSTEMS OF DIFFERENT RADIO ACCESS TECHNOLOGIES

(71) Applicant: QUALCOMM Incorporated, San Diego, CA (US)

(72) Inventors: Li Liu, San Diego, CA (US); Chiewcharn Narathong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 13/919,756

(22) Filed: Jun. 17, 2013

(65) Prior Publication Data
US 2014/0370882 A1    Dec. 18, 2014

(51) Int. Cl.
*H04W 4/00* (2009.01)
*H04W 88/06* (2009.01)
*H04B 1/00* (2006.01)
*H04B 1/403* (2015.01)
(Continued)

(52) U.S. Cl.
CPC ............ *H04W 88/06* (2013.01); *H04B 1/0053* (2013.01); *H04B 1/403* (2013.01); *H04W 16/14* (2013.01); *H04W 72/1215* (2013.01)

(58) Field of Classification Search
CPC . H04W 72/1215; H04W 88/06; H04W 16/14; H04W 24/00; H04B 1/0053; H04B 1/403

USPC .......... 455/422.1, 127.4, 160.1, 552.1, 553.1, 455/426.1, 230, 161.1, 255, 457
See application file for complete search history.

(56) References Cited

U.S. PATENT DOCUMENTS

| 4,361,906 A | 11/1982 | Sakamoto |
| 5,649,308 A | 7/1997 | Andrews |

(Continued)

FOREIGN PATENT DOCUMENTS

| WO | WO-2008/003029 A1 | 1/2008 |
| WO | WO-2013/070189 A1 | 5/2013 |

OTHER PUBLICATIONS

International Search Report and Written Opinion—PCT/US2014/041641—ISA/EPO—Jan. 23, 2015. (21 total pages).

(Continued)

*Primary Examiner* — Amancio Gonzalez
(74) *Attorney, Agent, or Firm* — Arent Fox LLP (57) ABSTRACT

A wireless device supporting concurrent communication with multiple wireless systems of different radio access technologies (RATs) are disclosed. In an exemplary design, an apparatus includes first and second receivers supporting concurrent signal reception from wireless systems of different RATs. The first receiver receives a first downlink signal from a first wireless system of a first RAT. The second receiver receives a second downlink signal from a second wireless system of a second RAT, which is different from the first RAT. The first and second receivers may operate concurrently. The second receiver may be broadband and/or may support carrier aggregation. The apparatus may further include first and second local oscillator (LO) generators to generate LO signals for the first and second receivers, respectively, based on different divider ratios in order to mitigate voltage controlled oscillator (VCO) pulling.

15 Claims, 8 Drawing Sheets

(51) Int. Cl.
  *H04W 16/14* (2009.01)
  *H04W 72/12* (2009.01)

(56) References Cited

U.S. PATENT DOCUMENTS

| | | |
|---|---|---|
| 5,890,051 A | 3/1999 | Schlang et al. |
| 6,728,525 B1 | 4/2004 | Leizerovich et al. |
| 6,968,165 B2 * | 11/2005 | Shitara et al. ............... 455/230 |
| 7,444,166 B2 | 10/2008 | Sahota et al. |
| 8,811,922 B2 * | 8/2014 | Mujtaba et al. ........... 455/127.4 |
| 2004/0142723 A1 | 7/2004 | Shippee |
| 2004/0204035 A1 | 10/2004 | Raghuram et al. |
| 2005/0075077 A1 | 4/2005 | Mach et al. |
| 2007/0207760 A1 | 9/2007 | Kavadias et al. |
| 2010/0091688 A1 | 4/2010 | Staszewski et al. |
| 2010/0210272 A1 | 8/2010 | Sundström et al. |
| 2011/0140746 A1 | 6/2011 | Park et al. |
| 2011/0234335 A1 | 9/2011 | Khlat |
| 2012/0327825 A1 | 12/2012 | Gudem et al. |
| 2013/0016633 A1 | 1/2013 | Lum et al. |
| 2013/0029613 A1 | 1/2013 | Haralabidis et al. |
| 2013/0114405 A1 | 5/2013 | Kim et al. |
| 2014/0148152 A1 * | 5/2014 | Periyalwar et al. ........ 455/426.1 |

OTHER PUBLICATIONS

Partial International Search Report—PCT/US2014/041641—ISA/EPO—Oct. 9, 2014. (6 total pages).

* cited by examiner

METHOD AND APPARATUS FOR CONCURRENT COMMUNICATION WITH MULTIPLE WIRELESS COMMUNICATION SYSTEMS OF DIFFERENT RADIO ACCESS TECHNOLOGIES

BACKGROUND

I. Field

The present disclosure relates generally to electronics, and more specifically to techniques for supporting wireless communication.

II. Background

A wireless device (e.g., a cellular phone or a smartphone) may transmit and receive data for two-way communication with a wireless communication system. The wireless device may include a transmitter for data transmission and a receiver for data reception. For data transmission, the transmitter may modulate a transmit local oscillator (LO) signal with data to obtain a modulated radio frequency (RF) signal, amplify the modulated RF signal to obtain an output RF signal having the proper transmit power level, and transmit the output RF signal via an antenna to a base station. For data reception, the receiver may obtain a received RF signal via the antenna, amplify and downconvert the received RF signal with a receive LO signal, and process the downconverted signal to recover data sent by the base station.

A wireless device may support communication with multiple wireless systems of different radio access technologies (RATs). Each wireless system may have certain characteristics and requirements. It is desirable to efficiently support concurrent communication with wireless systems of different RATs.

SUMMARY

A wireless device supporting concurrent communication with multiple wireless systems of different RATs is disclosed herein. In an exemplary design, an apparatus (e.g., a wireless device or an integrated circuit (IC)) may include first and second receivers supporting concurrent signal reception from wireless systems of different RATs. The first receiver may receive a first downlink signal from a first wireless system of a first RAT. The second receiver may receive a second downlink signal from a second wireless system of a second RAT that is different from the first RAT. The first and second receivers may operate concurrently. The second receiver may (i) be broadband and support a plurality of frequency band and/or (ii) support carrier aggregation.

In an exemplary design, the first receiver may comprise a plurality of low-noise amplifiers (LNAs) for a plurality of bands. Each LNA may cover at least one of the plurality of bands. The second receiver may comprise a single LNA for the plurality of bands. In another exemplary design, the first receiver may comprise a first plurality of LNAs for a plurality of bands. The second receiver may comprise a second plurality of LNAs for the plurality of bands. In an exemplary design, the first and second receivers may concurrently receive downlink signals on first and second sets of carriers, respectively, for carrier aggregation.

The apparatus may further include first and second LO generators. The first LO generator may generate a first LO signal for the first receiver based on a first divider ratio. The second LO generator may generate a second LO signal for the second receiver based on a second divider ratio, which may be different from the first divider ratio. The first LO generator may include a first voltage controlled oscillator (VCO) operating at a first frequency. The second LO generator may include a second VCO operating at a second frequency. The first and second divider ratios may be selected to obtain at least a predetermined amount of separation between the first and second frequencies in order to mitigate VCO pulling.

The apparatus may further include first and second transmitters. The first transmitter may transmit a first uplink signal to the first wireless system of the first RAT. The second transmitter may transmit a second uplink signal to the second wireless system of the second RAT. The second transmitter may be broadband and/or may support carrier aggregation.

Various aspects and features of the disclosure are described in further detail below.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Figure 1:
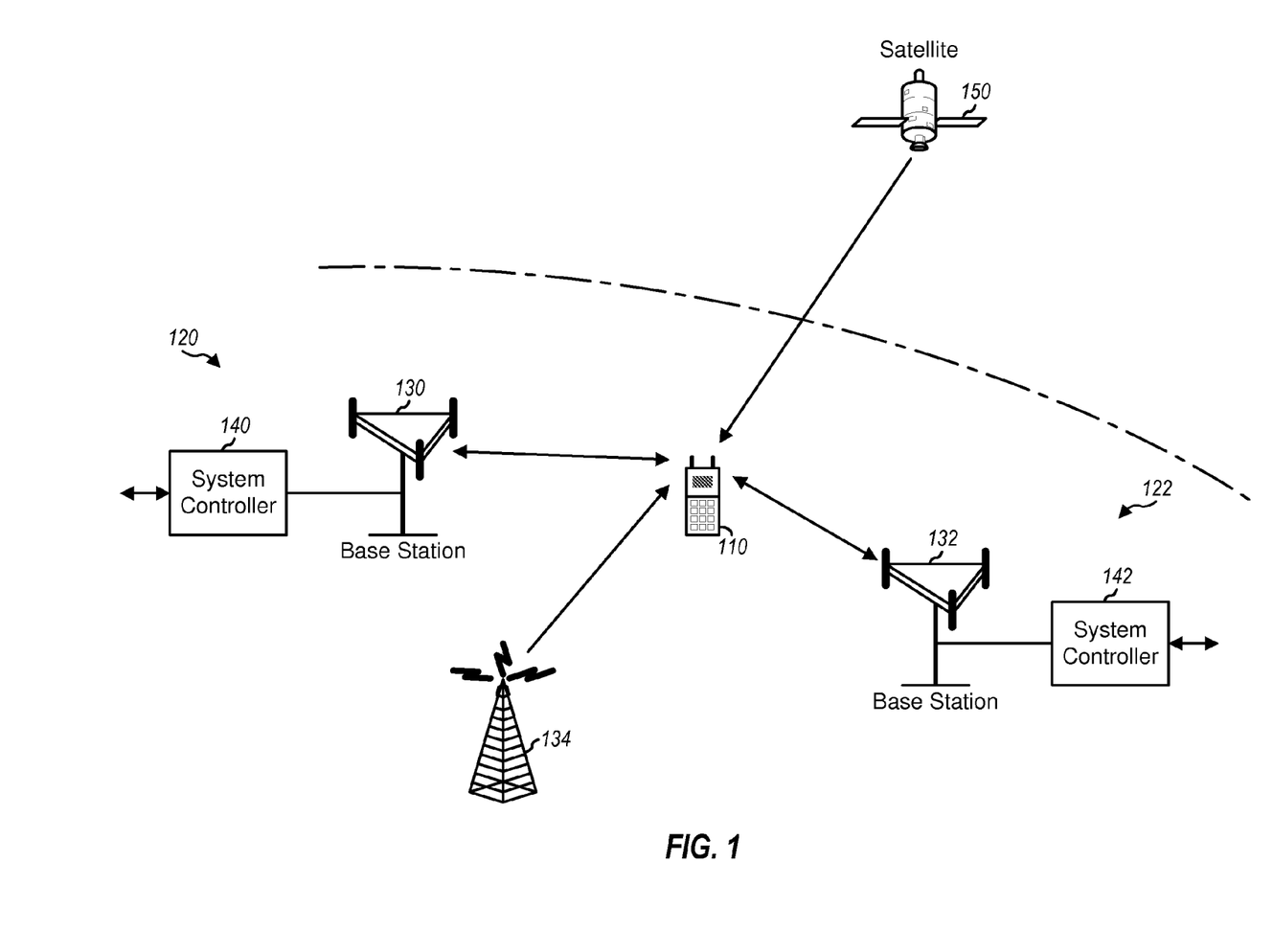
FIG. 1 shows a wireless device communicating with multiple wireless systems of different RATs.

FIG. 1 shows a wireless device 110 capable of communicating with multiple wireless communication systems of different RATs, which may include a first wireless system 120 of a first RAT and a second wireless system 122 of a second RAT. Wireless systems 120 and 122 may each be a Code Division Multiple Access (CDMA) system, a Global System for Mobile Communications (GSM) system, a Long Term Evolution (LTE) system, a wireless local area network (WLAN) system, or some other wireless system. A CDMA system may implement a RAT such as Wideband CDMA (WCDMA), CDMA 1× or cdma2000, Time Division Synchronous Code Division Multiple Access (TD-SCDMA), etc. For example, wireless system 120 may be a GSM system, and wireless system 122 may be a WCDMA system. As another example, wireless system 120 may be an LTE system, and wireless system 122 may be a CDMA system.

For simplicity, FIG. 1 shows wireless system 120 including one base station 130 and one system controller 140, and wireless system 122 including one base station 132 and one system controller 142. In general, each wireless system may include any number of base stations and any set of network entities. Each base station may support communication for wireless devices within its coverage.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may be capable of communicating with wireless system 120 and/or 122. Wireless device 110 may also be capable of receiving signals from broadcast stations (e.g., a broadcast station 134), satellites (e.g., a satellite 150) in one or more global navigation satellite systems (GNSS), etc. Wireless device 110 may support one or more RATs for wireless communication such as GSM, WCDMA, cdma2000, LTE, 802.11, etc. The terms "radio access technology", "RAT", "radio technology", "air interface", and "standard" are often used interchangeably.

Figure 2:
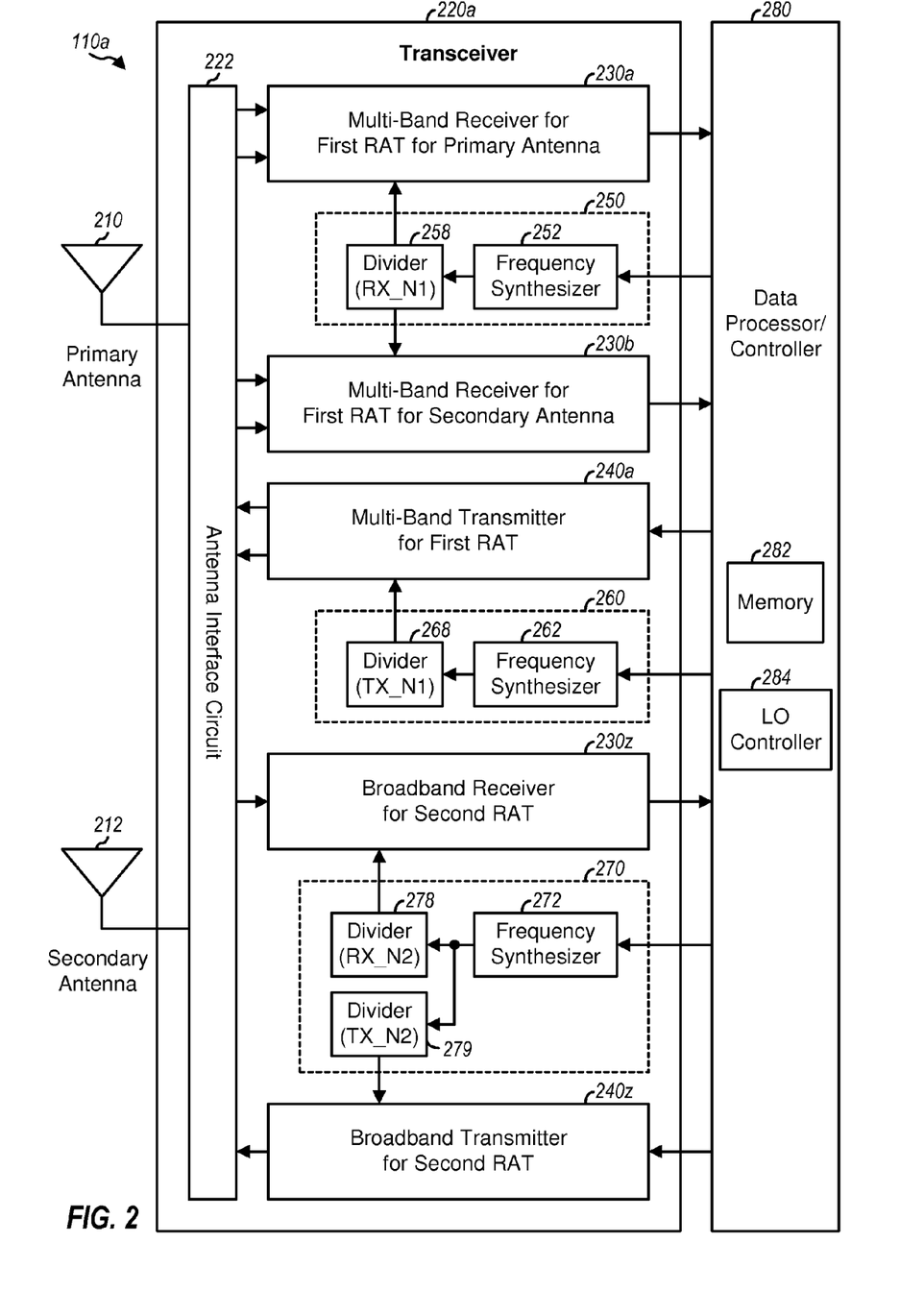
FIGS. 2 to 4 show three exemplary designs of the wireless device in FIG. 1.

FIG. 2 shows a block diagram of a wireless device 110a, which is one exemplary design of wireless device 110 in FIG. 1. In this design, wireless device 110a includes a primary antenna 210, a secondary antenna 212, a transceiver 220a, and a data processor/controller 280. Transceiver 220a supports signal reception from both antennas 210 and 212 for a first RAT, signal reception from antenna 210 for a second RAT, and signal transmission via antenna 210 for both the first and second RATs. Transceiver 220a also supports concurrent communication with both the first and second RATs.

In the design shown in FIG. 2, transceiver 220a includes an antenna interface circuit 222, a multi-band receiver 230a for a first RAT for primary antenna 210, a multi-band receiver 230b for the first RAT for secondary antenna 212, a multi-band transmitter 240a for the first RAT, a broadband receiver 230z for a second RAT, and a broadband transmitter 240z for the second RAT. A multi-band receiver or a multi-band transmitter may support multiple frequency bands (or simply, "bands") and may include circuits designed for meet applicable requirements for each supported band. For example, a multi-band receiver may include multiple low noise amplifiers (LNAs), with each LNA supporting one or more bands. A multi-band transmitter may include multiple power amplifiers (PAs), with each PA supporting one or more bands. Each PA may be a single-stage amplifier or a multi-stage amplifier and may have a fixed gain or a variable gain. A multi-stage amplifier may include an inter-stage filter or no inter-stage filter and may have inter-stage matching or no inter-stage matching. A portion of a multi-stage amplifier may be located off-chip, e.g., within an antenna interface circuit. A broadband receiver or a broadband transmitter may support multiple bands, may include circuits designed to provide good performance for all supported bands, and may have a reduced number of input and/or output ports. For example, a broadband receiver may include a single broadband/wideband LNA for all supported bands and may have a reduced number of input ports (e.g., one input port) in order to reduce pin count and save chip area on an IC chip. A multi-band transmitter may include a single broadband/wideband PA for all supported bands and may have a reduced number of output ports (e.g., one output port) in order to reduce pin count and save chip area on an IC chip. A broadband receiver or a transmitter broadband may interface with a tunable or switchable front-end circuit, which may further interface with an antenna interface circuit. Broadband performance may be achieved with or without single-pole-multiple-throw switches.

In the design shown in FIG. 2, transceiver 220a includes an LO generator 250 for receivers 230a and 230b for the first RAT, an LO generator 260 for transmitter 240a for the first RAT, and an LO generator 270 for receiver 230z and transmitter 240z for the second RAT. LO generator 250 generates receive LO signals for receivers 230a and 230b. In the design shown in FIG. 2, LO generator 250 includes a frequency synthesizer 252 and a divider 258. Frequency synthesizer 252 generates a first oscillator signal at a first frequency. Divider 258 divides the first oscillator signal in frequency by a factor of RX_N1 to generate receive LO signals at a target RX frequency for receivers 230a and 230b. RX_N1 is a frequency divider ratio for receivers 230a and 230b.

LO generator 260 generates a transmit LO signal for transmitter 240a. LO generator 260 includes a frequency synthesizer 262 and a divider 268. Frequency synthesizer 262 generates a second oscillator signal at a second frequency. Divider 268 divides the second oscillator signal in frequency by a factor of TX_N1 to generate the transmit LO signal at a target TX frequency for transmitter 240a.

LO generator 270 generates receive and transmit LO signals for receiver 230z and transmitter 240z. LO generator 270 includes a frequency synthesizer 272 and dividers 278 and 279. Frequency synthesizer 272 generates a third oscillator signal at a third frequency. Divider 278 divides the third oscillator signal in frequency by a factor of RX_N2 to generate a receive LO signal at a target RX frequency for receiver 230z. Divider 279 divides the third oscillator signal in frequency by a factor of TX_N2 to generate a transmit LO signal at a target TX frequency for transmitter 240z.

Data processor/controller 280 may perform various functions for wireless device 110a. For example, data processor 210 may perform processing for data received via receivers 230 and processing for data transmitted via transmitters 240. Controller 280 may control the operation of various circuits within receivers 230 and transmitters 240. A memory 282 may store program codes and data for data processor/controller 280. Memory 282 may be internal to data processor/controller 280 (as shown in FIG. 2) or external to data processor/controller 280 (not shown in FIG. 2). An LO controller 284 may control the operation of LO generators 250, 260 and 270. For example, LO controller 284 may select a suitable divider ratio for each LO signal being generated, so that good performance can be obtained, as described below. Data processor/controller 280 may be implemented on one or more application specific integrated circuits (ASICs) and/or other ICs.

Receivers 230a and 230z may operate concurrently to receive downlink signals from two wireless systems of different RATs. Receiver 230a may receive downlink signals from a first wireless system of a first RAT, e.g., WCDMA. Receiver 230z may concurrently receive downlink signals from a second wireless system of a second RAT, e.g., GSM. For example, receiver 230a may support bi-directional communication with the first wireless system, and receiver 230z may support monitoring and/or measurement of the second wireless system for inter-RAT (IRAT) operation.

Transmitters 240a and 240z may operate to transmit uplink signals to one or more wireless systems. Transmitter 240a may transmit a first uplink signal to the first wireless system of the first RAT. Transmitter 240z may concurrently transmit a second uplink signal to the second wireless system of the second RAT. For example, transmitter 240a may support communication with the first wireless system, and transmitter 240z may support reporting of feedback information (e.g., received signal strength) to the second wireless system.

In general, any combination of receivers 230 and transmitters 240 may be active at any given moment. For example, receivers 230a and 230z may be active concurrently to receive downlink signals from two wireless systems of different RATs. Transmitters 240a and 240z may be active concurrently to transmit uplink signals to two wireless systems of different RATs. One or more receivers 230 and one or more transmitters 240 may also be active concurrently to receive downlink signals and transmit uplink signals to multiple wireless systems of different RATs.

Receivers 230a, 230b and 230z may each support one or more RATs. The LO generator for each receiver 230 may be designed to meet applicable requirements for each RAT supported by that receiver. For example, receiver 230a may support GSM, and LO generator 250 may be required to achieve (i) −35 dBc integrated phase noise (IPN) from 100 Hertz (Hz) to 100 kiloHertz (KHz) and (ii) −118 dBc phase noise at 400 KHz offset. Alternatively or additionally, receiver 230a may support LTE, and LO generator 250 may be required to achieve −38 dBc IPN from 5 KHz to 9 megaHertz (MHz).

LO generator 250 may support multiple RATs and may have one or more configurable parameters in order to meet applicable requirements for each supported RAT. The configurable parameter(s) may include configurable loop bandwidth, loop filter, VCO gain (Kvco), charge pump, reference clock, etc. Each configurable parameter may have multiple possible settings. A suitable setting may be selected for each configurable parameter based on the requirements of the RAT being supported. In one design, a look-up table may implement a two-dimensional table having columns for configurable parameters and rows for supported RATs. An entry in column x and row y may store a parameter value to use for a configurable parameter corresponding to column x for a RAT corresponding to row y. The look-up table may be accessed with a RAT with which communication is established or desired. Parameter values from entries in the row corresponding to the RAT may be retrieved and applied to LO generator 250.

In general, each LO generator may support one or more RATs. Each LO generator may have fixed parameters and/or configurable parameters. Each configurable parameter may be set to a suitable value based on the requirements of a RAT with which communication is established or desired.

LO controller 284 within data processor/controller 280 may receive information indicative of (i) which receivers 230 (if any) and which transmitters 240 (if any) are active and (ii) an RX frequency of each active receiver 230 and a TX frequency of each active transmitter 240. LO controller 284 may determine a divider ratio for each LO generator for each active receiver or transmitter such that (i) an LO signal at a target frequency is provided to each active receiver or transmitter and (ii) VCOs for all active receivers and transmitters do not operate too close in frequency in order to mitigate VCO pulling. Two VCOs may be considered to be too close in frequency if their operating frequencies are within a predetermined threshold, i.e., if the absolute difference between the VCO operating frequencies is less than the predetermined threshold. For example, if RX and/or TX frequencies for active receivers and/or transmitters are too close in frequency, then LO controller 284 may select different divider ratios for the VCOs for the active receivers and/or transmitters so that the operating frequencies of the VCOs are not too close to each other. LO controller 284 may dynamically determine divider ratios for the active receivers and/or transmitters, e.g., whenever there is a change in frequency or a change in active receiver or transmitter. This may provide good performance for simultaneous reception and/or transmission from/to multiple wireless systems of different RATs.

Wireless device 110 may support carrier aggregation, which is operation on multiple carriers. Carrier aggregation may also be referred to as multi-carrier operation. A carrier may refer to a range of frequencies used for communication and may be associated with certain characteristics. For example, a carrier may be associated with system information and/or control information describing operation on the carrier. A carrier may also be referred to as a component carrier (CC), a frequency channel, a cell, etc. A band may include one or more carriers. Each carrier may cover up to 20 MHz in LTE. Wireless device 110 may be configured with up to 5 carriers in one or two bands in LTE Release 11.

Wireless device 110 may include multiple receivers to concurrently receive multiple downlink signals at different frequencies. These multiple downlink signals may be sent by one or more base stations on multiple carriers at different frequencies for carrier aggregation. Each receiver may receive one or more downlink signals sent on one or more carriers to wireless device 110.

Figure 3:
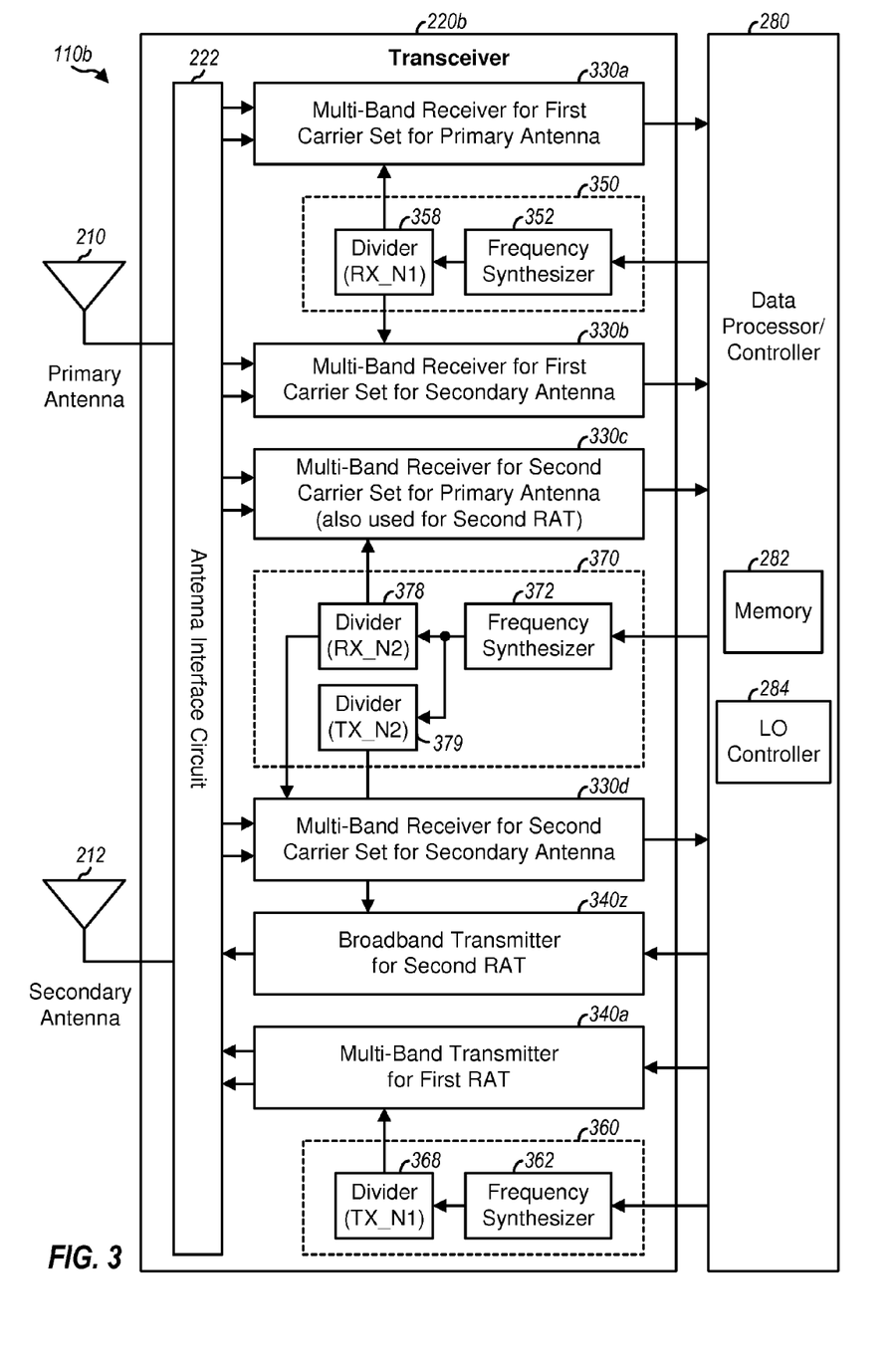

FIG. 3 shows a block diagram of a wireless device 110b, which is another exemplary design of wireless device 110 in FIG. 1. In this design, wireless device 110b includes antennas 210 and 212, a transceiver 220b, and data processor/controller 280. Transceiver 220b includes antenna interface circuit 222, multi-band receivers 330a and 330b for a first carrier set for antennas 210 and 212, respectively, multi-band receivers 330c and 330d for a second carrier set for antennas 210 and 212, respectively, a multi-band transmitter 340a for a first RAT, and a broadband transmitter 340z for a second RAT.

Transceiver 220b further includes an LO generator 350 for receivers 330a and 330b, an LO generator 360 for transmitter 340a, and an LO generator 370 for receivers 330c and 330d and transmitter 340z. LO generator 350 generates receive LO signals for receivers 330a and 330b and includes a frequency synthesizer 352 and a divider 358. LO generator 360 generates a transmit LO signal for transmitter 340a and includes a frequency synthesizer 362 and a divider 368. LO generator 370 generates receive LO signals for receivers 330a and 330b and a transmit LO signal for transmitter 340z. LO generator 370 includes a frequency synthesizer 372 and dividers 378 and 379.

Receiver 330a and 330b may be used to receive downlink signals on a first set of carriers via antennas 210 and 212, respectively. Receiver 330c and 330d may be used to receive downlink signals on a second set of carriers via antennas 210 and 212, respectively. Receivers 330a, 330b, 330c and 330d may be designed to meet applicable requirements for signal reception with carrier aggregation. Transmitter 340a may be designed to meet applicable requirements for signal transmission. Transmitter 340z may be a broadband transmitter supporting multiple bands.

Receivers 330a and 330c may operate concurrently to receive downlink signals on multiple sets of carriers for carrier aggregation. Receivers 330a and 330c may also operate concurrently to receive downlink signals from two wireless systems of different RATs for inter-RAT operation. Receiver 330a may receive downlink signals from a first wireless system of a first RAT, e.g., LTE. Receiver 330c may concurrently receive downlink signals from a second wireless system of a second RAT, e.g., GSM. For example, receiver 330a may support communication with the first wireless system, and receiver 330c may support monitoring and/or measurement of the second wireless system for inter-RAT operation.

Transmitters 340a and/or 340z may operate to transmit uplink signals to one or more wireless systems. Transmitter 340a may transmit a first uplink signal to the first wireless system of the first RAT. Transmitter 340z may concurrently transmit a second uplink signal to the second wireless system of the second RAT. For example, transmitter 340a may support communication with the first wireless system, and transmitter 340z may support reporting of feedback information (e.g., received signal strength) to the second wireless system.

In general, any combination of receivers and transmitters may be active at any given moment. For example, receivers 330a and 330c may be active concurrently to receive downlink signals from two wireless systems of different RATs. Transmitters 340a and 340z may be active concurrently to transmit uplink signals to two wireless systems of different RATs. One or more receivers 330 and one or more transmitters 340 may also be active concurrently to receive downlink signals and transmit uplink signals to multiple wireless systems of different RATs.

Figure 4:
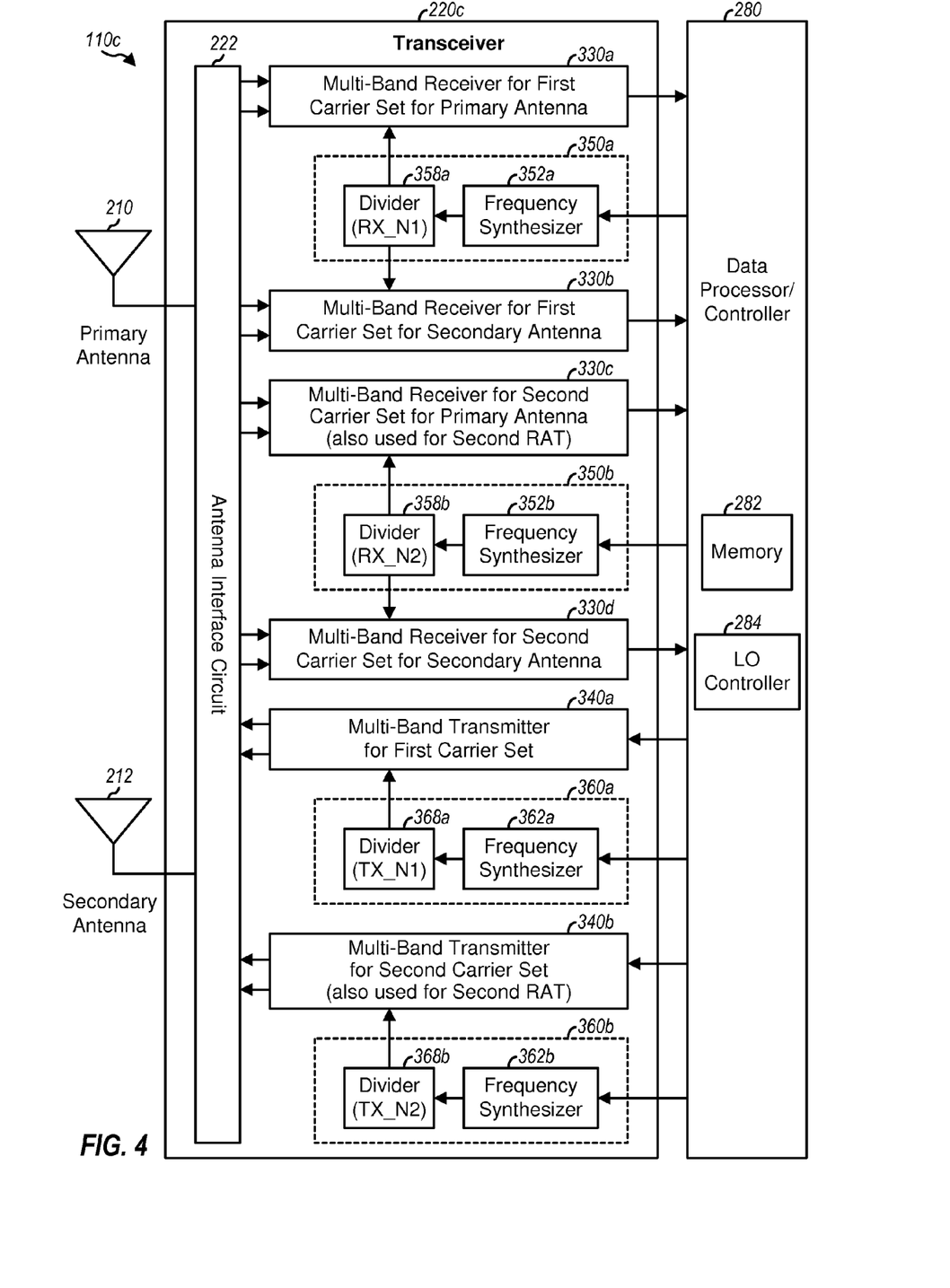

FIG. 4 shows a block diagram of a wireless device 110c, which is yet another exemplary design of wireless device 110 in FIG. 1. In this design, wireless device 110c includes antennas 210 and 212, a transceiver 220c, and data processor/controller 280. Transceiver 220c includes antenna interface circuit 222, multi-band receivers 330a, 330b, 330c and 330d and transmitter 340a, which are part of transceiver 220b in FIG. 3. Transceiver 220c also includes a multi-band transmitter 340b for the second carrier set.

Transceiver 220c further includes an LO generator 350a for receivers 330a and 330b, an LO generator 350b for receivers 330c and 330d, an LO generator 360a for transmitter 340a, and an LO generator 360b for transmitter 340b. LO generator 350a generates receive LO signals for receivers 330a and 330b and includes a frequency synthesizer 352a and a divider 358a. LO generator 350b generates receive LO signals for receivers 330c and 330d and includes a frequency synthesizer 352b and a divider 358b. LO generator 360a generates a transmit LO signal for transmitter 340a and includes a frequency synthesizer 362a and a divider 368a. LO generator 360b generates a transmit LO signal for transmitter 340b and includes a frequency synthesizer 362b and a divider 368b.

Receivers 330a and 330b may be used to receive downlink signals on a first set of carriers via antennas 210 and 212, respectively. Receivers 330c and 330d may be used to receive downlink signals on a second set of carriers via antennas 210 and 212, respectively. Receivers 330a, 330b, 330c and 330d may be designed to meet applicable requirements for signal reception with carrier aggregation.

Transmitter 340a may be used to transmit uplink signals on the first set of carriers via antenna 210 and/or 212. Transmitter 340b may be used to transmit uplink signals on the second set of carriers via antenna 210 and/or 212. Transmitters 340a and 340b may be designed to meet applicable requirements for signal transmission with carrier aggregation.

Receivers 330a and 330c may operate concurrently to receive downlink signals on multiple sets of carriers for carrier aggregation. Receivers 330a and 330c may also operate concurrently to receive downlink signals from two wireless systems of different RATs for inter-RAT operation. Receiver 330a may receive downlink signals from a first wireless system of a first RAT, e.g., LTE. Receiver 330c may concurrently receive downlink signals from a second wireless system of a second RAT, e.g., GSM. For example, receiver 330a may support communication with the first wireless system, and receiver 330c may support monitoring and/or measurement of the second wireless system for inter-RAT operation.

Transmitters 340a and 340b may operate concurrently to transmit uplink signals on multiple sets of carriers for carrier aggregation. Transmitters 340a and 340b may also operate concurrently to transmit uplink signals to two wireless systems of different RATs for inter-RAT operation. Transmitter 340a may transmit a first uplink signal to the first wireless system of the first RAT. Transmitter 340b may concurrently transmit a second uplink signal to the second wireless system of the second RAT. For example, transmitter 340a may support communication with the first wireless system, and transmitter 340b may support reporting of feedback information (e.g., received signal strength) to the second wireless system.

In general, any combination of receivers and transmitters may be active at any given moment. For example, receivers 330a and 330c may be active concurrently to receive downlink signals from two wireless systems of different RATs. Transmitters 340a and 340b may be active concurrently to transmit uplink signals to two wireless systems of different RATs. One or more receivers 330 and one or more transmitters 340 may also be active concurrently to receive downlink signals and transmit uplink signals to multiple wireless systems of different RATs.

The receivers and transmitters in FIGS. 2 to 4 may be implemented in various manners. A transmitter or a receiver may be implemented with a super-heterodyne architecture or a direct-conversion architecture. In the super-heterodyne architecture, a signal is frequency converted between RF and baseband in multiple stages, e.g., from RF to an intermediate frequency (IF) in one stage, and then from IF to baseband in another stage for a receiver. In the direct-conversion architecture, which is also referred to as a zero-IF architecture, a signal is frequency converted between RF and baseband in one stage. The super-heterodyne and direct-conversion architectures may use different circuit blocks and/or have different requirements. Some exemplary designs of receivers and transmitters implemented with the direct-conversion architecture are described below.

Figure 5:
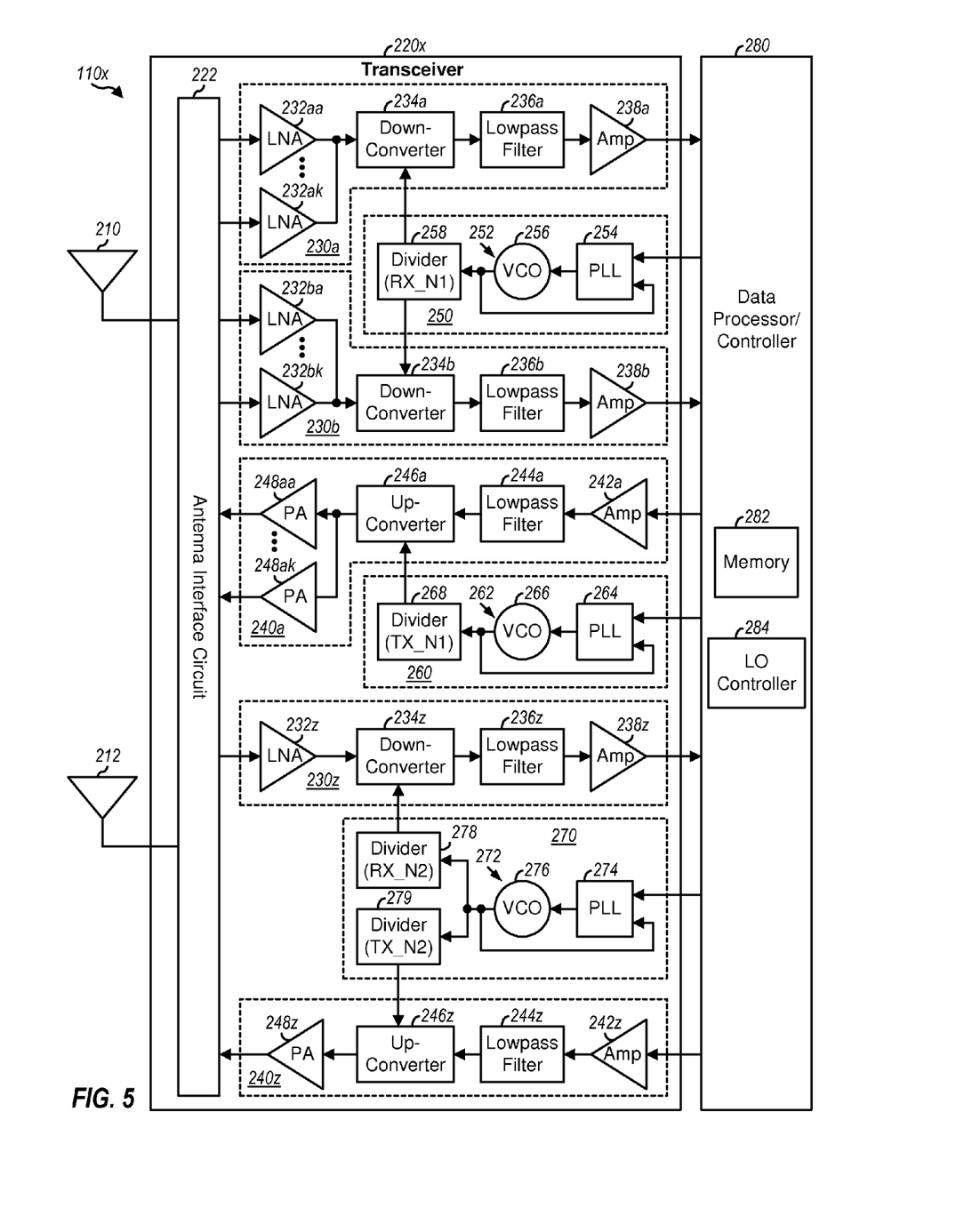
FIGS. 5 to 7 show exemplary designs of transceivers within the wireless device in FIGS. 2 to 4, respectively.

FIG. 5 shows a block diagram of a wireless device 110x, which is one exemplary design of wireless device 110a in FIG. 2. In the design shown in FIG. 5, multi-band receiver 230a includes multiple (K) LNAs 232aa to 232ak, a downconverter 234a, a lowpass filter (LPF) 236a, and an amplifier (Amp) 238a. LNAs 232aa to 232ak have their inputs coupled to primary antenna 210 via antenna interface circuit 222 and their outputs coupled to downconverter 234a. Downconverter 234a has its output coupled to lowpass filter 236a, which has its output coupled to amplifier 238a. Multi-band receiver 230b includes multiple (K) LNAs 232ba to 232bk, a downconverter 234b, a lowpass filter 236b, and an amplifier 238b, which are coupled in similar manner as LNAs 232aa to 232ak, downconverter 234a, lowpass filter 236a, and amplifier 238a in receiver 230a. Broadband receiver 230z includes an LNA 232z, a downconverter 234z, a lowpass filter 236z, and an amplifier 238z, which are coupled as shown in FIG. 5.

In the design shown in FIG. 5, multi-band transmitter 240a includes an amplifier (Amp) 242a, a lowpass filter 244a, an upconverter 246a, and multiple (K) power amplifiers (PAs) 248aa to 248ak. Amplifier 242a has its input coupled to data processor 280 and its output coupled to lowpass filter 244a. Lowpass filter 244a has its output coupled to upconverter 246a. PAs 248aa to 248ak have their inputs coupled to upconverter 246a and their outputs coupled to antenna 210 via antenna interface circuit 222. Broadband transmitter 240z includes an amplifier 242z, a lowpass filter 244z, an upconverter 246z, and a PA 248z, which are coupled as shown in FIG. 5. PA 248z may be coupled to primary antenna 210 or secondary antenna 212 via antenna interface circuit 222.

FIG. 5 shows an exemplary design of receivers 230a, 230b and 230z. In general, a receiver may include any set of circuits to process a received RF signal. For example, a receiver may include one or more amplifiers, filters, downconverters, etc. FIG. 5 also shows an exemplary design of transmitters 240a and 240z. In general, a transmitter may include any set of circuits to generate an output RF signal. For example, a transmitter may include one or more amplifiers, filters, upconverters, etc.

The circuits in a receiver or a transmitter may be arranged differently from the configuration shown in FIG. 5. For example, a receiver may include an amplifier between a downconverter and a lowpass filter. A transmitter may include an amplifier between a lowpass filter and an upconverter. Other circuits not shown in FIG. 5 may also be used to condition the signals in a transmitter or a receiver. For example, matching circuits may be located at an output of a PA and/or at an input of an LNA. Some circuits in FIG. 5 may also be omitted. All or a portion of transceiver 220x may be implemented on one or more analog integrated circuits (ICs), RF ICs (RFICs), mixed-signal ICs, etc.

Wireless device 110x may support reception of downlink signals from one or more wireless systems via primary antenna 210 and/or secondary antenna 212. Wireless device 110x may also support transmission of uplink signals to one or more wireless systems via primary antenna 210 and/or secondary antenna 212.

For signal reception via primary antenna 210, signals transmitted by base stations and/or other transmitter stations may be received by antenna 210, which may provide a primary received RF signal. Antenna interface circuit 222 may filter and route the primary received RF signal to a selected receiver 230a or 230z. Antenna interface circuit 222 may include one or more switches, duplexers, diplexers, transmit filters, receive filters, matching circuits, directional couplers, etc. If receiver 230a is the selected receiver, then the primary received RF signal may be amplified by a selected LNA among the K LNAs 232aa to 232ak. Downconverter 234a may downconvert the amplified RF signal from the selected LNA with a receive LO signal from LO generator 250 and provide a downconverted signal. The downconverted signal may be filtered by lowpass filter 236a and amplified by amplifier 238a to obtain a baseband input signal, which may be provided to data processor 280. If receiver 230z is the selected receiver, then the primary received RF signal may be amplified by LNA 232z, downconverted by downconverter 234z, filtered by lowpass filter 236z, and amplified by amplifier 238z to obtain a baseband input signal, which may be provided to data processor 280.

For signal reception via secondary antenna 212, signals transmitted by base stations and/or other transmitter stations may be received by antenna 212, which may provide a secondary received RF signal to receiver 230b via antenna interface circuit 222. The secondary received RF signal may be amplified by one of LNAs 232ba to 232bk, downconverted by downconverter 234b, filtered by lowpass filter 236b, and amplified by amplifier 238b to obtain a baseband input signal, which may be provided to data processor 280.

For signal transmission, data processor 280 may process data to be transmitted and provide a first output baseband signal to transmitter 240a. Within transmitter 240a, the first output baseband signal may be amplified by amplifier 242a, filtered by lowpass filter 244a, upconverted by upconverter 246a, and amplified by one of PAs 248aa to 248ak to obtain a first output RF signal. The first output RF signal may be routed through antenna interface circuit 222 and transmitted via antenna 210 and/or 212. Alternatively or additionally, data processor 280 may provide a second output baseband signal to transmitter 240z. Within transmitter 240z, the second output baseband signal may be amplified by amplifier 242z, filtered by lowpass filter 244z, upconverted by upconverter 246z, and amplified by PA 248z to obtain a second output RF signal, which may be routed through antenna interface circuit 222 and transmitted via antenna 212.

LO generator 250 generates receive LO signals for receivers 230a and 230b. In the design shown in FIG. 5, LO generator 250 includes frequency synthesizer 252 and divider 258, and frequency synthesizer 252 includes a phase locked loop (PLL) 254 and a VCO 256. VCO 256 generates a first oscillator signal at a first frequency, which is determined by a first control signal from PLL 254. PLL 254 receives a reference signal and the first oscillator signal, compares the phase of the first oscillator signal against the phase of the reference signal, and generates the first control signal for VCO 256 such that the phase of the first oscillator signal is locked to the phase of the reference signal. Divider 258 divides the first oscillator signal in frequency by a factor of RX_N1 to generate receive LO signals at a target RX frequency for downconverters 234a and 234b in receivers 230a and 230b.

LO generator 260 generates a transmit LO signal for transmitter 240a. LO generator 260 includes frequency synthesizer 262 and a divider 268, and frequency synthesizer 262 includes a PLL 264 and a VCO 266. Frequency synthesizer 262 generates a second oscillator signal at a second frequency. Divider 268 divides the second oscillator signal in frequency by a factor of TX_N1 to generate the transmit LO signal at a target TX frequency for upconverter 246a in transmitter 240a.

LO generator 270 generates receive and transmit LO signals for receiver 230z and transmitter 240z. LO generator 270 includes frequency synthesizer 272 and dividers 278 and 279, and frequency synthesizer 272 includes a PLL 274 and a VCO 276. Frequency synthesizer 272 generates a third oscillator signal at a third frequency. Divider 278 divides the third oscillator signal in frequency by a factor of RX_N2 to generate a receive LO signal at a target RX frequency for downconverter 234z within receiver 230z. Divider 279 divides the third oscillator signal in frequency by a factor of TX_N2 to generate a transmit LO signal at a target TX frequency for upconverter 246z within transmitter 240z.

In the design shown in FIG. 5, multi-band receiver 230a includes multiple LNAs 232aa to 232ak to support multiple bands. Each LNA 232 may support one or more bands and may be coupled to a separate matching circuit (e.g., within antenna interface circuit 222) for the one or more bands covered by that LNA. The multiple LNAs 232aa to 232ak may allow receiver 230a to meet applicable requirements, e.g., for linearity, dynamic range, noise figure, etc. These requirements may be dependent on one or more RATs supported by receiver 230a.

Broadband receiver 230z may support multiple bands using broadband circuits. For example, receiver 230z may include a single broadband LNA 232z that can support multiple bands. LNA 232z may have a different circuit design than LNAs 232aa to 232ak. For example, LNA 232z may be implemented with a common-gate LNA having its source receiving a received RF signal and its gate coupled to alternating current (AC) ground. In contrast, LNAs 232aa to 232ak may each be implemented with a common-source LNA having its gate receiving a received RF signal and its source coupled to circuit ground or a source degeneration inductor. Other circuits in broadband receiver 230z may also be designed to support broadband operation. For example, downconverter 234z may be designed to operate at multiple bands. Lowpass filter 236z may be designed with a configurable bandwidth.

In the design shown in FIG. 5, multi-band transmitter 240a includes multiple PAs 248aa to 248ak to support multiple bands. Each PA 248 may support one or more bands and may be coupled to a separate matching circuit (e.g., within antenna interface circuit 222) for the one or more bands covered by that PA. The multiple PAs 248aa to 248ak may allow transmitter 240a to meet applicable requirements, e.g., for linearity, dynamic range, output power, etc. These requirements may be dependent on one or more RATs supported by transmitter 240a.

Broadband transmitter 240z may support multiple bands using broadband circuits. For example, transmitter 240z may include a single broadband PA 248z that can support multiple bands. PA 248z may have a different circuit design than PAs 248aa to 248ak.

In the designs shown in FIGS. 2 and 5, receiver 230z and transmitter 240z may be broadband in order to save IC chip area and cost. Receiver 230z and transmitter 240z may also be multi-mode and may support all RATs supported by receiver 230a and transmitter 240a. Receiver 230z and transmitter 240z may share one LO generator 270 in order to save IC chip area. The operation of receiver 230a and transmitter 240a may be negligibly affected when receiver 230z and transmitter 240z are turned ON or OFF.

Multiple VCOs 256 and 276 within frequency synthesizers 252 and 272 may be used to generate receive LO signals to support concurrent reception of downlink signals from multiple wireless systems of different RATs. LO generators 250 and 270 may be configured to support concurrent signal reception for multiple RATs. For example, receivers 230a and 230z may concurrently receive downlink signals from WCDMA and GSM systems, respectively, in UMTS Band 8 (B8). A first RX frequency (or RX1 frequency) for receiver 230a for the WCDMA system may be close or far from a second RX frequency (or RX2 frequency) for receiver 230z for the GSM system. If the RX1 frequency is close to the RX2 frequency (e.g., separated by 0.1 MHz or less) and if the same divider ratio (e.g., RX_N1=RX_N2) is used for both dividers 258 and 278, then VCOs 256 and 276 may operate at close frequencies and may pull each other. Frequency synthesizers 252 and 272 may then have degraded phase noise and spurious performance due to VCO pulling.

In an exemplary design, different divider ratios may be used for LO generators for multiple receivers operating concurrently. In the example described above, different divider ratios (RX_N1≠RX_N2) may be used for dividers 258 and 278 in LO generators 250 and 270 in order to mitigate VCO pulling. The divider ratios RX_N1 and RX_N2 may be selected such that the operating frequency of VCO 256 is sufficiently far from the operating frequency of VCO 276 in order to mitigate VCO pulling.

In an exemplary design, different divider ratios may be used for LO generators for multiple transmitters operating concurrently. For example, different divider ratios TX_N1 and TX_N2 may be used for dividers 268 and 279 in LO generators 260 and 270 in order to mitigate VCO pulling. The divider ratios TX_N1 and TX_N2 may be selected such that the operating frequency of VCO 256 is sufficiently far from the operating frequency of VCO 276 in order to mitigate VCO pulling.

In an exemplary design, different divider ratios may be used for LO generators for a receiver and a transmitter operating concurrently. In one operating scenario, receivers 230a and 230z and transmitter 240a may operate concurrently. Receiver 230a and transmitter 240a may support communication with a first wireless system of a first RAT. Receiver 230z may support signal reception from a second wireless system of a second RAT. Divider ratio RX_N2 for divider 278 and divider ratio TX_N1 for divider 268 may be selected such that (i) a transmit LO signal at a desired TX frequency is obtained for transmitter 240a, (ii) a receive LO signal at a desired RX frequency is obtained for receiver 230z, and (iii) the frequency of VCO 266 for transmitter 240b is not too close to the frequency of VCO 276 for receiver 230z in order to mitigate VCO pulling.

In another operating scenario, receivers 230a and 230z and transmitters 240a and 240z may operate concurrently. Receiver 230a and transmitter 240a may support communication with a first wireless system of a first RAT. Receiver 230z and transmitter 240z may support communication with a second wireless system of a second RAT. Divider ratio RX_N1 for divider 258, divider ratio TX_N1 for divider 268, divider ratio RX_N2 for divider 278, and divider ratio TX_N2 for divider 279 may be selected such that (i) transmit LO signals at desired TX frequencies are obtained for transmitters 240a and 240z, (ii) receive LO signals at desired RX frequencies are obtained for receivers 230a and 230z, and (iii) the frequencies of VCOs 256, 266 and 276 are not too close together in order to mitigate VCO pulling.

Receiver 230z and transmitter 240z may be active concurrently to monitor and/or measure downlink signals from the second wireless system and report feedback information to the second wireless system. If the second wireless system utilizes time division duplexing (TDD), then the RX frequency for the second wireless system is equal to the TX frequency for the second wireless system, and one LO generator 270 may be used to generate both the receive LO signal for receiver 230z and the transmit LO signal for transmitter 240z. LO generator 270 may operate in a time division multiplexed manner and may generate the receive LO signal during receive time intervals or the transmit LO signal during transmit time intervals. In this case, VCO pulling would not be encountered by LO generator 270.

Figure 6:
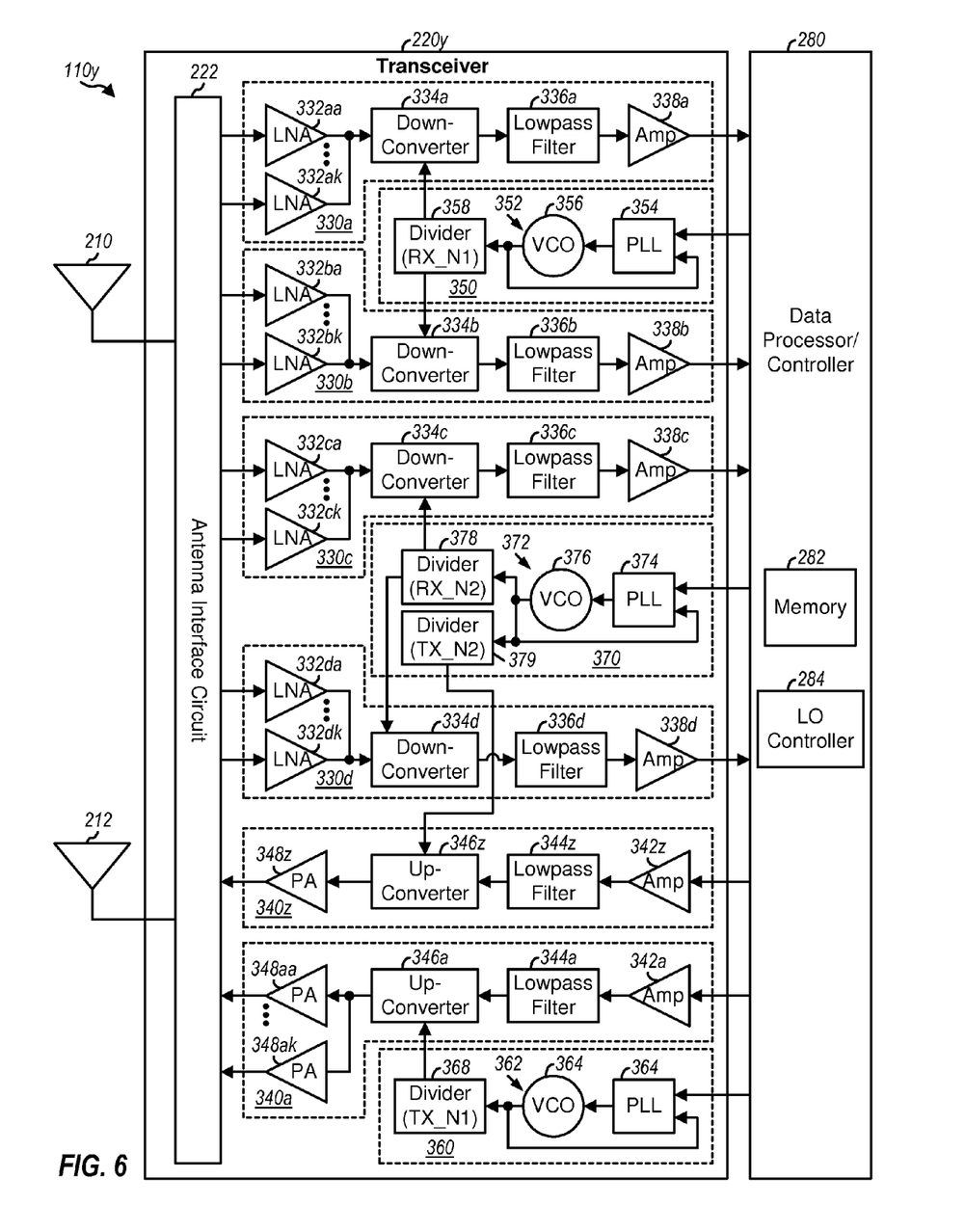

FIG. 6 shows a block diagram of a wireless device 110y, which is an exemplary design of wireless device 110b in FIG. 3. In this design, multi-band receiver 330a includes multiple (K) LNAs 332aa to 332ak, a downconverter 334a, a lowpass filter 336a, and an amplifier 338a, which are coupled as shown in FIG. 6. Multi-band receivers 330b, 330c and 330d may each be implemented in similar manner as multi-band receiver 330a. Multi-band transmitter 340a includes an amplifier 342a, a lowpass filter 344a, an upconverter 346a, and multiple (K) PAs 348aa to 348ak, which are coupled as shown in FIG. 6. Broadband transmitter 340z includes an amplifier 342z, a lowpass filter 344z, an upconverter 346z, and a broadband PA 348z, which are coupled as shown in FIG. 6.

LO generator 350 generates receive LO signals for receivers 330a and 330b and includes frequency synthesizer 352 and divider 358. Frequency synthesizer 352 includes a PLL 354 and a VCO 356. LO generator 360 generates a transmit LO signal for transmitter 340a and includes frequency synthesizer 362 and divider 368. Frequency synthesizer 362 includes a PLL 364 and a VCO 366. LO generator 370 generates receive LO signals for receivers 330c and 330d and a transmit LO signal for transmitter 340z. LO generator 370 includes frequency synthesizer 372 and dividers 378 and 379, and frequency synthesizer 372 includes a PLL 374 and a VCO 376.

LO generators 350, 360 and/or 370 may generate LO signals for active receivers 330 and/or transmitters 340. A divider ratio of each LO generator for each active receiver or transmitter may be selected such that (i) an LO signal at a target frequency is provided to each active receiver or transmitter and (ii) VCOs for all active receivers and transmitters do not operate too close in frequency in order to mitigate VCO pulling.

Figure 7:
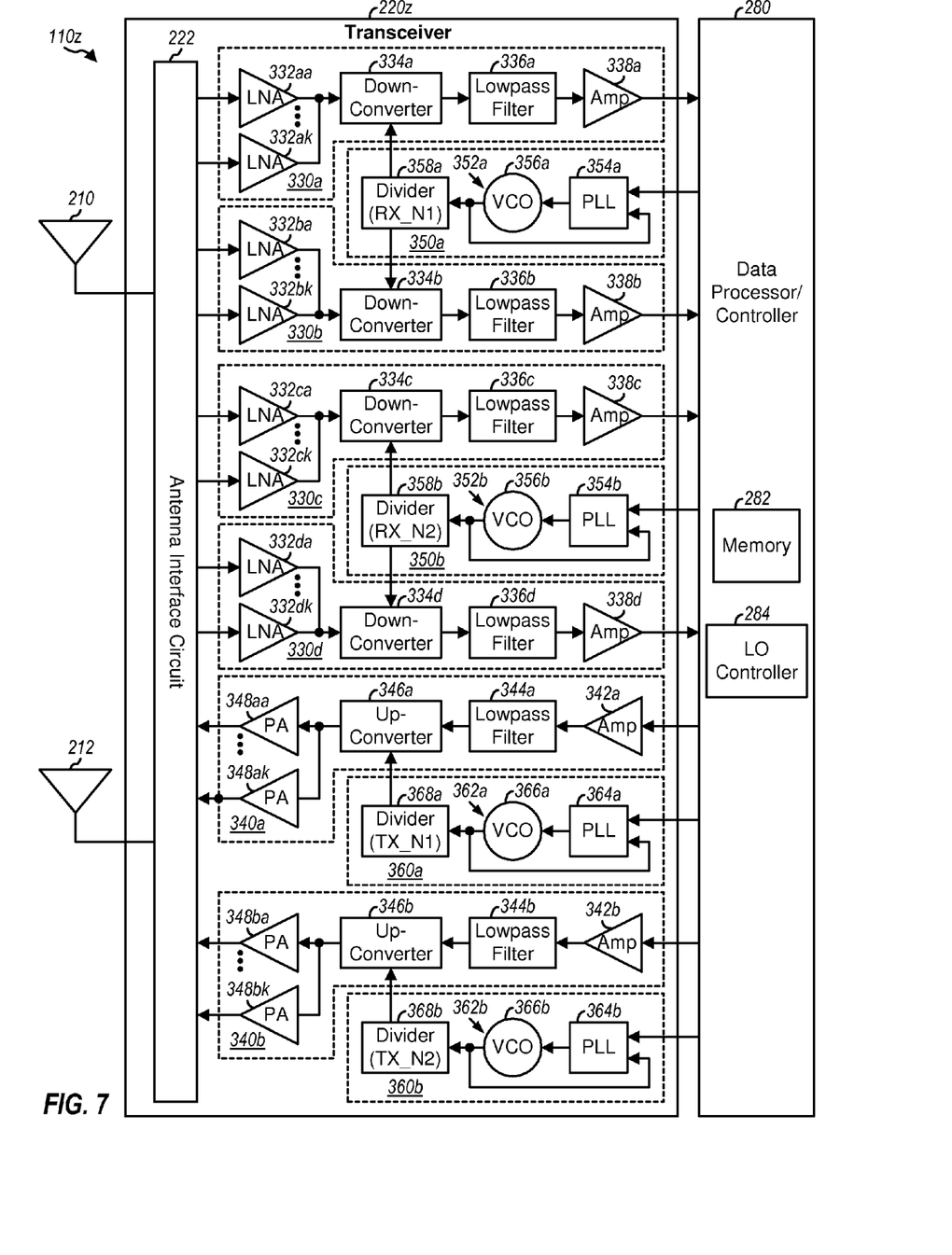

FIG. 7 shows a block diagram of a wireless device 110z, which is an exemplary design of wireless device 110c in FIG.

4. In this design, receivers 330a, 330b, 330c and 330d and transmitter 340a are implemented as shown in FIG. 6 and described above. Multi-band transmitter 340b includes an amplifier 342b, a lowpass filter 344b, an upconverter 346b, and multiple (K) PAs 348ba to 348bk, which are coupled as shown in FIG. 7.

LO generator 350a generates receive LO signals for receivers 330a and 330b and includes (i) a frequency synthesizer 352a comprising a PLL 354a and a VCO 356a and (ii) a divider 358a. LO generators 350b generates receive LO signals for receivers 330c and 330d and includes (i) a frequency synthesizer 352b comprising a PLL 354b and a VCO 356b and (ii) a divider 358b. LO generator 360a generates a transmit LO signal for transmitter 340a and includes (i) a frequency synthesizer 362a comprising a PLL 364a and a VCO 366a and (ii) a divider 368a. LO generator 360b generates a transmit LO signal for transmitter 340b and includes (i) a frequency synthesizer 362b comprising a PLL 364b and a VCO 366b and (ii) a divider 368b.

LO generators 350a, 350b, 360a and/or 360b may generate LO signals for active receivers 330 and/or transmitters 340. A divider ratio of each LO generator for each active receiver or transmitter may be selected such that (i) an LO signal at a target frequency is provided to each active receiver or transmitter and (ii) VCOs for all active receivers and transmitters do not operate too close in frequency in order to mitigate VCO pulling.

In an exemplary design, an apparatus (e.g., a wireless device, an IC, a circuit module, etc.) may include first and second receivers supporting concurrent signal reception from wireless systems of different RATs. The first receiver (receiver 230a in FIG. 2 or receiver 330a in FIG. 3) may receive a first downlink signal from a first wireless system (e.g., wireless system 120 in FIG. 1) of a first RAT. The second receiver (e.g., receiver 230z in FIG. 2 or receiver 330c in FIG. 3) may receive a second downlink signal from a second wireless system (e.g., wireless system 122 in FIG. 1) of a second RAT that is different from the first RAT. The first and second receivers may operate concurrently. The second receiver may be broadband and/or may support carrier aggregation.

In an exemplary design, the first receiver (e.g., receiver 230a in FIG. 5) may be a multi-band receiver and may comprise a plurality of LNAs (e.g., LNA 232aa to 232ak) for a plurality of bands. Each LNA may cover at least one of the plurality of bands. The second receiver (e.g., receiver 230z) may be a broadband receiver and may comprise a single LNA (e.g., LNA 232z) for the plurality of bands. In another exemplary design, the first receiver (e.g., receiver 330a in FIG. 6) may comprise a first plurality of LNAs (e.g., LNAs 330aa to 330ak) for a plurality of bands. The second receiver (e.g., receiver 330c) may comprise a second plurality of LNAs (e.g., LNAs 332ca to 332ck) for the plurality of bands. The first and second receivers may concurrently receive downlink signals on first and second sets of carriers, respectively, for carrier aggregation.

The apparatus may further include first and second LO generators. The first LO) generator (e.g., LO generator 250 in FIG. 5 or LO generator 350 in FIG. 6) may generate a first LO signal for the first receiver based on a first divider ratio (e.g., RX_N1). The second LO generator (e.g., LO generator 270 in FIG. 5 or LO generator 370 in FIG. 6) may generate a second LO signal for the second receiver based on a second divider ratio (e.g., RX_N2). The second divider ratio may be different from the first divider ratio. The first LO generator may include a first VCO (e.g., VCO 256 in FIG. 5 or VCO 356 in FIG. 6) operating at a first frequency. The second LO generator may include a second VCO (e.g., VCO 276 in FIG. 5 or VCO 376 in FIG. 6) operating at a second frequency. The first and second divider ratios may be selected to obtain at least a predetermined amount of separation between the first and second frequencies.

The apparatus may further include first and second transmitters. The first transmitter (e.g., transmitter 240a in FIG. 2 or transmitter 340a in FIG. 3) may transmit a first uplink signal to the first wireless system of the first RAT. The second transmitter (e.g., transmitter 240z in FIG. 2, transmitter 340z in FIG. 3, or transmitter 340b in FIG. 4) may transmit a second uplink signal to the second wireless system of the second RAT. The second transmitter may be broadband (as shown in FIGS. 2 and 3) or may support carrier aggregation (as shown in FIG. 4).

The apparatus may include at least one LO generator (e.g., LO generator 260 and/or 270 in FIG. 5, or LO generator 360 and/or 370 in FIG. 6) to generate (i) a first LO signal for the first transmitter based on a first divider ratio (e.g., TX_N1) and (ii) a second LO signal for the second receiver based on a second divider ratio (e.g., RX_N2). The at least one LO generator may include a first VCO (e.g., VCO 266 in FIG. 5 or VCO 366 in FIG. 6) operating at a first frequency and a second VCO (e.g., VCO 276 in FIG. 5 or VCO 376 in FIG. 6) operating at a second frequency. The first and second divider ratios may be selected to obtain at least a predetermined amount of separation between the first and second frequencies.

In an exemplary design, the apparatus may include first, second and third LO generators. The first LO generator (e.g., LO generator 250 in FIG. 5, or LO generator 350 in FIG. 6) may generate a first LO signal for the first receiver based on a first divider ratio (e.g., RX_N1). The second LO generator (e.g., LO generator 270 in FIG. 5 or LO generator 370 in FIG. 6) may generate a second LO signal for the second receiver based on a second divider ratio (e.g., RX_N2). The third LO generator (e.g., LO generator 260 in FIG. 5 or LO generator 360 in FIG. 6) may generate a third LO signal for the first transmitter based on a third divider ratio (e.g., TX_N1). The second LO generator may also generate a fourth LO signal for the second transmitter based on a fourth divider ratio (e.g., TX_N2). The first LO generator may include a first VCO (e.g., VCO 256 in FIG. 5 or VCO 356 in FIG. 6) operating at a first frequency. The second LO generator may include a second VCO (e.g., VCO 276 in FIG. 5 or VCO 376 in FIG. 6) operating at a second frequency. The third LO generator may include a third VCO (e.g., VCO 266 in FIG. 5 or VCO 366 in FIG. 6) operating at a third frequency. The first, second and third divider ratios may be selected to obtain at least a predetermined amount of separation between any two of the first, second and third frequencies.

Figure 8:
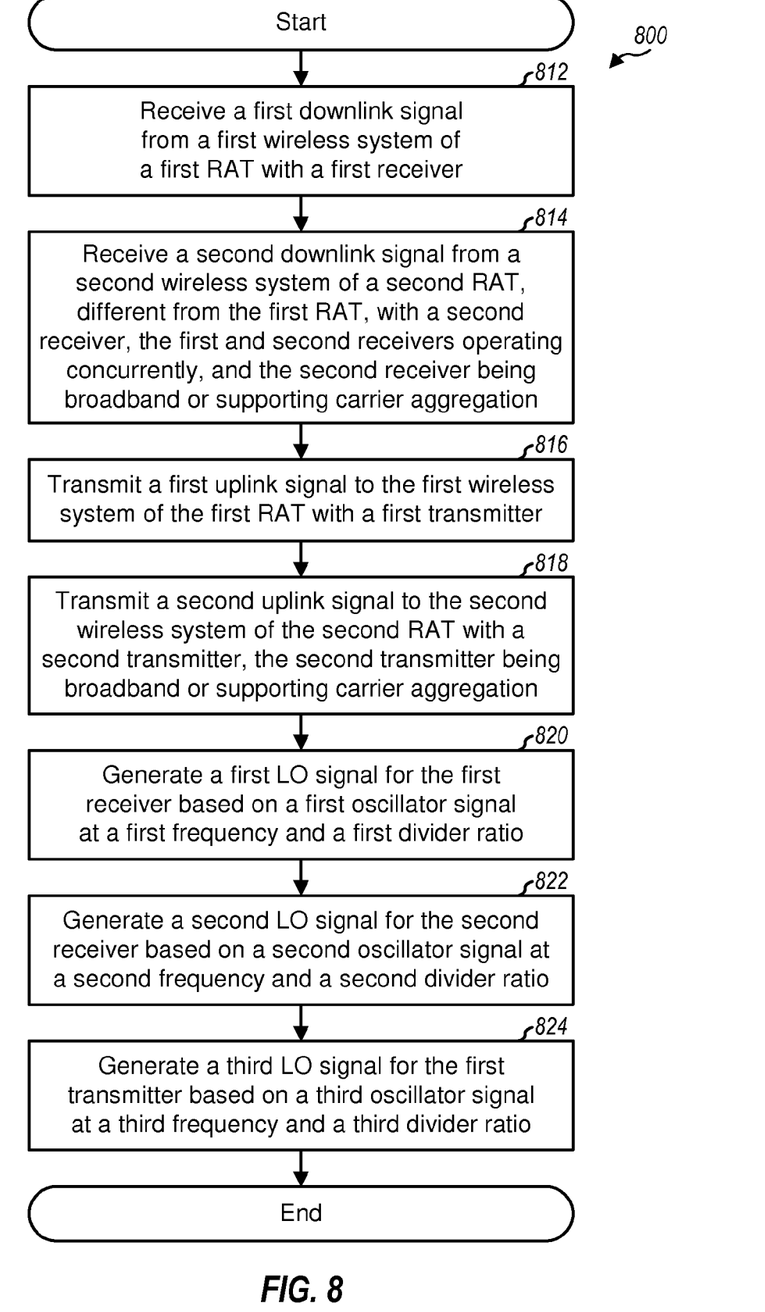
FIG. 8 shows a process for supporting wireless communication.

FIG. 8 shows an exemplary design of a process 800 for supporting wireless communication. Process 800 may be performed by a wireless device or by some other entity. A first downlink signal may be received from a first wireless system of a first RAT with a first receiver (block 812). A second downlink signal may be received from a second wireless system of a second RAT, different from the first RAT, with a second receiver (block 814). The first and second receivers may operate concurrently. The second receiver may be broadband and/or may support carrier aggregation.

A first uplink signal may be transmitted to the first wireless system of the first RAT with a first transmitter (block 816). A second uplink signal may be transmitted to the second wireless system of the second RAT with a second transmitter (block 818). The second transmitter may be broadband and/or may support carrier aggregation.

A first LO signal may be generated for the first receiver based on a first divider ratio (block 820). A second LO signal may be generated for the second receiver based on a second divider ratio that is different from the first divider ratio (block 822). The first LO signal may be generated based on a first oscillator signal at a first frequency, and the second LO signal may be generated based on a second oscillator signal at a second frequency. The first and second divider ratios may be selected to obtain at least a predetermined amount of separation between the first and second frequencies. A third LO signal may be generated for the first transmitter based on a third oscillator signal at a third frequency and a third divider ratio (block 824). The first, second and third divider ratios may be selected to obtain at least a predetermined amount of separation between any two of the first, second and third frequencies.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
    a first receiver configured to receive a first downlink signal from a first wireless system of a first radio access technology (RAT); and
    a second receiver configured to receive a second downlink signal from a second wireless system of a second RAT different from the first RAT, the first receiver and the second receiver configured to operate concurrently to receive the first downlink signal and the second downlink signal, respectively;
    a local oscillator (LO) controller configured to select a first divider ratio and a second divider ratio, the second divider ratio different from the first divider ratio;
    a first LO generator configured to generate a first LO signal at the first frequency for the first receiver based on the first divider ratio; and
    a second LO generator configured to generate a second LO signal at the second frequency for the second receiver based on the second divider ratio.

2. The apparatus of claim 1, the first receiver comprising a plurality of low noise amplifiers (LNAs) for a plurality of bands, each LNA covering at least one of the plurality of bands.

3. The apparatus of claim 1, the first receiver comprising a first plurality of low noise amplifiers (LNAs) for a plurality of bands, the second receiver comprising a second plurality of LNAs for the plurality of bands, and the first receiver and the second receiver configured to concurrently receive the first downlink signal and the second downlink signal, respectively, on a first set of carriers and a second set of carriers, respectively, for carrier aggregation.

4. The apparatus of claim 1, wherein the first divider ratio and the second divider ratio are selected to obtain at least a first predetermined amount of separation between the first and second frequencies.

5. The apparatus of claim 1, further comprising:
a first transmitter configured to transmit a first uplink signal to the first wireless system of the first RAT; and
a second transmitter configured to transmit a second uplink signal to the second wireless system of the second RAT.

6. The apparatus of claim 5, further comprising:
a third local oscillator (LO) generator configured to generate a third LO signal for the first transmitter based on a third divider ratio and the second LO generator further configured to generate a fourth LO signal for the second transmitter based on a fourth divider ratio,
wherein the LO controller selects the third divider ratio and the fourth divider ratio to obtain a second predetermined amount of separation between the third frequency and the fourth frequency.

7. The apparatus of claim 6, wherein the first LO generator comprises a first voltage controlled oscillator (VCO) operating at the first frequency and a second VCO operating at the second frequency.

8. The apparatus of claim 6, the first LO generator comprising a first voltage controlled oscillator (VCO) operating at the first frequency, the second LO generator comprising a second VCO operating at the second frequency, the third LO generator comprising a third VCO operating at the third frequency, and the first divider ratio, the second divider ratio, and the third divider ratio being selected to obtain at least a predetermined amount of separation between any two of the first frequency, the second frequency, and the third frequency.

9. A method for wireless communication, comprising:
receiving, at a first receiver, a first downlink signal from a first wireless system of a first radio access technology (RAT);
receiving, at a second receiver, a second downlink signal from a second wireless system of a second RAT different from the first RAT, the first receiver and the second receiver operating concurrently to receive the first downlink signal and the second downlink signal, respectively;
selecting a first divider ratio and a second divider ratio, the second divider ratio different from the first divider ratio;
generating a first local oscillator (LO) signal at the first frequency for the first receiver based on the first divider ratio; and
generating a second LO signal at the second frequency for the second receiver based on the second divider ratio.

10. The method of claim 9, wherein the first divider ratio and the second divider ratios are selected to obtain at least a predetermined amount of separation between the first and second frequencies.

11. The method of claim 9, further comprising:
transmitting a first uplink signal to the first wireless system of the first RAT with a first transmitter; and
transmitting a second uplink signal to the second wireless system of the second RAT with a second transmitter.

12. An apparatus for wireless communication, comprising:
means for receiving a first downlink signal from a first wireless system of a first radio access technology (RAT);
means for receiving a second downlink signal from a second wireless system of a second RAT different from the first RAT, wherein the means for receiving the first signal and the means for receiving the second downlink signal are configured to operate concurrently to receive the first downlink signal and the second downlink signal, respectively;
means for selecting a first divider ratio and a second divider ratio, the second divider ratio different from the first divider ratio;
means for generating a first local oscillator (LO) signal at the first frequency based on the first divider ratio; and
means for generating a second LO signal at the second frequency based on the second divider ratio.

13. The apparatus of claim 12, wherein the first and second divider ratios are selected to obtain at least a predetermined amount of separation between the first and second frequencies.

14. The apparatus of claim 12, further comprising:
means for transmitting a first uplink signal to the first wireless system of the first RAT; and
means for transmitting a second uplink signal to the second wireless system of the second RAT.

15. A non-transitory computer-readable medium storing computer executable code for wireless communications, comprising:
code for causing a first receiver to receive a first downlink signal from a first wireless system of a first radio access technology (RAT);
code for causing a second receiver to receive a second downlink signal from a second wireless system of a second RAT different from the first RAT, the code for causing the first receiver to receive the first downlink signal and the code for causing the second receiver to receive the second downlink signal being configured to cause the first receiver and the second receiver to operate concurrently to receive the first downlink signal and the second downlink signal, respectively;
code for causing a local oscillator (LO) controller to select a first divider ratio and a second divider ratio, the second divider ratio different from the first divider ratio;
code for causing a first LO generator to generate a first LO signal at the first frequency for the first receiver based on the first divider ratio; and
code for causing a second LO generator to generate a second LO signal at the second frequency for the second receiver based on the second divider ratio.

* * * * *